J. SAILER.
AUTOMATIC CENTRIFUGAL DISCHARGING MACHINE.
APPLICATION FILED JULY 27, 1914.
1,170,001.
Patented Feb. 1, 1916.
2 SHEETS—SHEET 1.
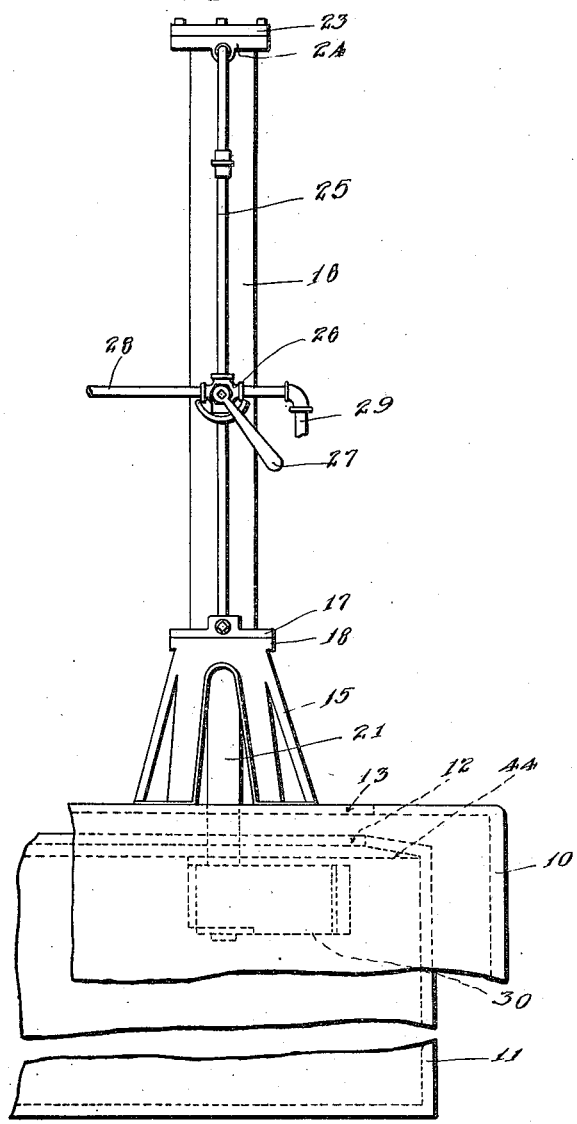
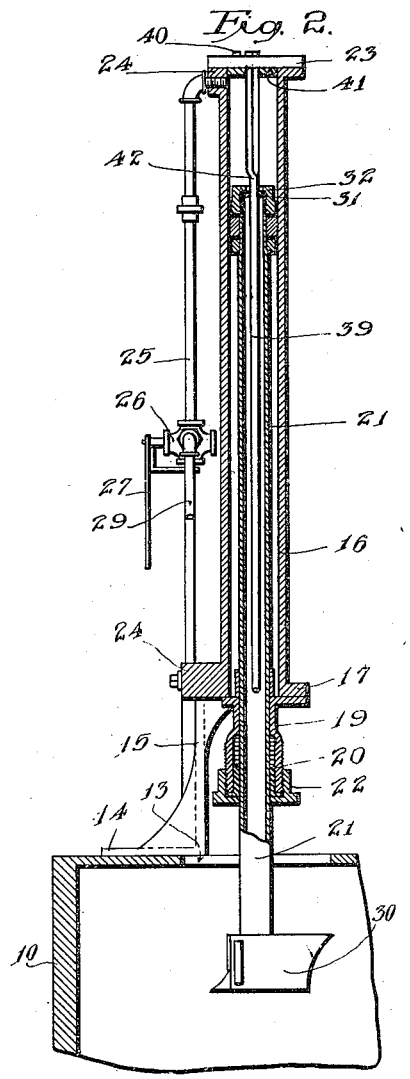
Inventor
Joseph Sailer J. SAILER.
AUTOMATIC CENTRIFUGAL DISCHARGING MACHINE.
APPLICATION FILED JULY 27, 1914.
1,170,001.
Patented Feb. 1, 1916.
2 SHEETS—SHEET 2.
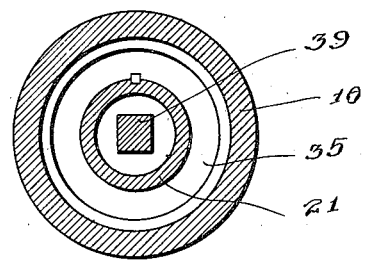
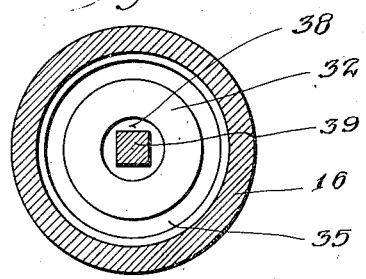
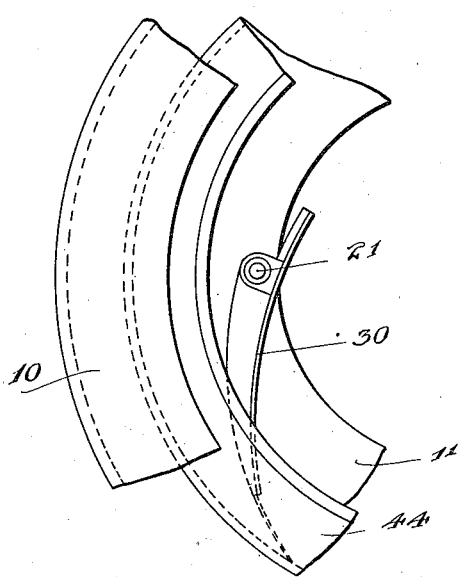
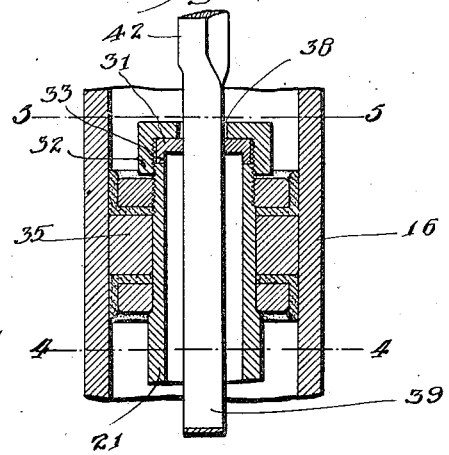
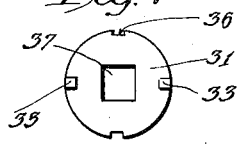
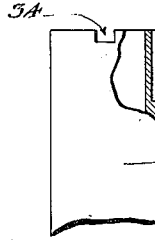
Witnesses:
Inventor
Joseph Sailer

UNITED STATES PATENT OFFICE.

JOSEPH SAILER, OF OXNARD, CALIFORNIA.

AUTOMATIC CENTRIFUGAL DISCHARGING-MACHINE.

1,170,001.  Specification of Letters Patent.  Patented Feb. 1, 1916.

Application filed July 27, 1914. Serial No. 853,323.

*To all whom it may concern:*

Be it known that I, Joseph Sailer, a citizen of the United States, residing at Oxnard, in the county of Ventura and State of California, have invented new and useful Improvements in Automatic Centrifugal Discharging-Machines, of which the following is a specification.

My invention pertains to centrifugal machines, and it has particular reference to mechanism for automatically cutting and discharging the products from centrifugal or other similar mechanism to which it may be applicable.

The object of my invention is to provide an automatic machine of this character which will entirely dispense with hand labor in discharging the centrifugals, and it is so constructed and arranged that the workman can perform the work without making it necessary for him to bend over into the basket of the machine, since the paddles or blades, which are used to remove and discharge the sugar, are so connected with a vertically movable piston rod that the operation of lowering the blades, and doing the work is all accomplished by the machinery, and controlled in a most efficient manner by the operator.

It also further provides a means whereby the speed of the cutting is automatically regulated, so that it will be impossible, by any carelessness on the part of the operator, to wear out the cutting blades unnecessarily, or to cause any damage to the revolving basket during the discharge operation.

The invention consists of a vertically-disposed cylinder with a piston rod therein, and suitable stuffing boxes, so arranged that it is double acting, and designed to be operated by either air or water, and the piston rod carries at its lower end the cutting blade, or paddle which is designed to operate within the basket of the machine, and this blade or paddle is so mounted on the piston that it is capable of having a slight rotary movement, whereby the blade may be withdrawn and cleared of the basket when in operation, by means of which the blade when lowered into the basket will automatically set itself in position to perform the required work. As it is necessary in mechanism of this character to cut the sugar at the perimeter of the basket at different speeds, as the blade descends, provision is made whereby the speed is automatically changed to suit the conditions, all of which will now be set forth in detail.

In the accompanying drawings, Figure 1 is a front elevation of the discharging machine. Fig. 2 is a vertical section of the cylinder and piston for the discharging machine. Fig. 3 is a top view of a centrifugal machine showing the relative position of the discharge mechanism. Fig. 4 is a horizontal section of the upper end of the piston rod, and cylinder on line 4 of Fig. 6. Fig. 5 is a horizontal section of the cylinder on line 5 of Fig. 6. Fig. 6 is a vertical section of portions of the cylinder and piston rod. Fig. 7 is a view of the lower side of the disk at the end of the cylinder. Fig. 8 is an edge view of the disk, and Fig. 9 is a side view of the upper end of the piston rod, partly in section.

In constructing my invention it is my desire to apply it to any type of centrifugal machine, one form of this machine being shown by the main cylindrical body 10, which has within it the usual basket 11, provided with the enlarged upper opening 12. The main cylindrical body 10 has a circular opening 13 through its upper end, and mounted on the body is the base flange 14 of an upwardly projecting bracket 15, which is designed to carry the cylinder and operating piston rod of the discharging mechanism.

A vertical cylinder 16, flanged at its lower end, as shown at 17, is secured by bolts or otherwise to the top of the bracket flange 18, and integral with the flange 18, and projecting downwardly therefrom is a tubular extension 19, provided at its lower end with an annular channel to receive therein packing material 20, which is held in position within the channel, and against the piston rod 21 by means of the conventional stuffing box 22. The upper end of this cylinder 16 has a suitable removable head 23, and at each end of the cylinder is a boss for a pipe connection as at 24, and a pipe 25 connects with the opposite ends of the cylinder, this pipe having an intermediate four-way valve 26, provided with a lever 27, and so operatively connected up that when steam or other compressed fluid enters the supply port 28, the fluid will enter one end of the cylinder and be discharged from the other end of the cylinder through the discharge pipe 29, as is usual with valves of this type.

The principal feature of this invention resides in the construction and arrangement of the piston rod 21 within the cylinder 16. It will be noted that the cylinder 21 projects through the stuffing box at the lower end of the cylinder, and it carries on its lower end the discharging shoe 30, which is designed to engage with the perimeter of the basket when in operation, and in order to provide a means whereby the shoe may be swung a sufficient distance to clear the margin of the opening of the basket, it is necessary to partially rotate the piston rod during the downward or upward movement of the piston rod. To accomplish this I provide the upper end of the tubular piston rod 21 with a disk 31 of hardened steel, this disk being held in position by a cap 32 which is flanged and threaded so that it will screw down and firmly hold the disk in position. For the purpose of preventing the disk from turning, it is provided with a pair of downwardly projecting lugs 33 on opposite sides, these lugs being designed to enter notches 34 in the end of the piston rod 21.

It will be noticed that the upper end of the piston rod has a packing ring 35 attached thereto which serves as a piston, and to provide a means for preventing the piston from turning a groove 36 is provided in the wall of the piston rod, and a corresponding groove in the piston to receive a key.

The disk 31 has a square hole 37, and the head of the cap has a round hole 38, the object of the square hole being to receive therein a bar 39 square in cross section, which bar projects down into the tubular piston. The upper end of this bar 39 is secured to the head 23 of the cylinder, in such a manner that it may be revolubly adjusted a limited distance, this adjustment being made by a screw 40, which passes through a flange 41 integral with the bar. The end of the bar 39 projects through the cylinder head, and its squared end is thereby exposed to permit of the bar to be turned by a wrench and thus set it in any desired position by the adjusting screw 40.

Near the upper end the bar 39 has an eighth twist, as shown at 42, so that when the piston rod moves up or down, the disk through which the bar passes will follow the twist and thus cause the piston rod to turn and thereby swing the shoe at its lower end clear of the margin of the basket.

The location of the twist in the bar is such that the bar is rotated during the downward movement of the piston rod at that point where the cutting edge of the shoe has just passed down below the marginal opening of the basket, so that the cutting point of the shoe will follow the upper inclined wall 44 of the basket and when the piston rod moves upwardly the rotation of the piston will also permit the cutting point to retreat from the periphery of the basket and move upwardly and inwardly against the upper inclined wall.

It is obvious that while this invention has been described as relating particularly to centrifugal machines for cutting and discharging sugar, the elementary components of the invention, as set forth herein, may also be applied to any character of machine for handling other products and for other uses, without departing from the spirit of my invention.

What I claim is:

1. In a discharging device for centrifugals, a vertically disposed cylinder, a piston rod extending through the same and carrying a cutting and discharging shoe at its lower end, means for vertically moving said piston rod in either direction, means for partially rotating said piston rod during its movement, said last mentioned means including a disk through which the piston rod passes to limit its rotary movement.

2. In a discharging device for centrifugals, a centrifugal separator, having in combination therewith and attached thereto a vertically movable cutting and discharging shoe, said shoe adapted to be lowered into the centrifugal and automatically swung into operative position during its downward movement, and swung clear of the centrifugal when said shoe is moved vertically upward.

3. In a discharge device for centrifugals, a cylinder, a tubular piston rod therein projecting from the lower end of the cylinder and carrying a cutting shoe, a bar, square in cross section with a partial twist, the upper end secured to the cylinder, and a head in the piston with a square opening therein to receive the twisted bar, and by means of which the piston rod may be partially rotated during its vertical movements.

4. In a discharge device for centrifugals, a cylinder, a tubular piston rod therein, a bar, square in cross section, and partially twisted, secured at its upper end to the head of the cylinder and provided with means whereby said bar may be rotated and set at any desired point, and a squared opening in the head of the piston to receive the bar, and whereby said piston rod may be partially rotated during its vertical movement in either direction.

5. In a discharging device for centrifugals, a cylinder, a tubular piston rod therein, a disk having centrally a square aperture, a cap for securing said disk to the end of the piston rod, and a bar, square in cross section, and partially twisted with its upper end secured to the cylinder head and slidably operable through the square aperture of the disk.

6. In a discharging device for centrifugals, a cylinder, a tubular piston rod therein, a disk having centrally a squared aperture, means to prevent said disk from rotating, a cap to prevent vertical displacement of said disk, a rod, square in cross section, and having a partial twist in one portion of its body, secured at its upper end to the cylinder head, and movable through said disk.

7. In a discharging device for centrifugals, a cylinder, a tubular piston rod therein, the lower end of which projects from the bottom of the cylinder and carries thereon a cutting shoe, a disk at the upper end of the piston rod having a squared aperture therein, means to prevent the rotation of said disk, a cap to prevent vertical displacement of the disk, a rod, square in cross section, and having a partial twist in one portion of its body, adjustably secured at its upper end to the cylinder head, said rod passing through the apertured disk in the head of the piston.

In testimony whereof, I have hereunto set my hand at Los Angeles, California, this 18th day of July, 1914.

JOSEPH SAILER.

In presence of—
  G. T. HACKLEY,
  LORRAIN E. DURROW.